(12) United States Patent
Schroth

(10) Patent No.: US 7,814,789 B2
(45) Date of Patent: Oct. 19, 2010

(54) DEVICE FOR DETERMINING AND/OR MONITORING THE FILL-LEVEL PROCESS VARIABLE OF A SUBSTANCE IN A CONTAINER

(75) Inventor: Herbert Schroth, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 216 days.

(21) Appl. No.: 11/792,617

(22) PCT Filed: Nov. 29, 2005

(86) PCT No.: PCT/EP2005/056325

§ 371 (c)(1),
(2), (4) Date: Jun. 10, 2008

(87) PCT Pub. No.: WO2006/063929

PCT Pub. Date: Jun. 22, 2006

(65) Prior Publication Data

US 2008/0307881 A1 Dec. 18, 2008

(30) Foreign Application Priority Data

Dec. 13, 2004 (DE) .................. 10 2004 060 119

(51) Int. Cl.
G01F 23/26 (2006.01)
(52) U.S. Cl. .................. 73/304 C; 73/290 V
(58) Field of Classification Search ........... 73/304 C, 73/290 V, 290 R, 866.5
See application file for complete search history.

(56) References Cited

U.S. PATENT DOCUMENTS

| | | | |
|---|---|---|---|
| 3,477,290 A | 11/1969 | Lerner | |
| 4,523,465 A * | 6/1985 | Fasching et al. | 367/81 |
| 6,178,817 B1 | 1/2001 | Hewelt | |
| 6,691,570 B1 * | 2/2004 | Neuhaus et al. | 73/290 V |
| 6,820,510 B2 * | 11/2004 | Schroth et al. | 73/866.5 |
| 7,143,636 B2 * | 12/2006 | Schmitteckert | 73/52 |
| 7,237,435 B2 * | 7/2007 | Motzer et al. | 73/290 R |
| 7,327,272 B2 * | 2/2008 | Ferraro | 340/612 |
| 7,392,699 B2 * | 7/2008 | Motzer et al. | 73/290 R |
| 7,444,245 B2 * | 10/2008 | Pfeiffer et al. | 702/54 |
| 2009/0126480 A1 * | 5/2009 | Kuhny et al. | 73/290 V |
| 2009/0212996 A1 * | 8/2009 | Chen et al. | 342/124 |

FOREIGN PATENT DOCUMENTS

| | | |
|---|---|---|
| DE | 2 316 284 | 10/1973 |
| DE | 100 09 067 A1 | 8/2001 |
| EP | 0 780 664 A2 | 5/1997 |
| EP | 0 928 955 A2 | 7/1999 |
| EP | 1 217 342 A2 | 5/2002 |
| WO | WO 2004/065799 A2 | 8/2004 |

* cited by examiner

Primary Examiner—J M Saint Surin
(74) Attorney, Agent, or Firm—Bacon & Thomas, PLLC

(57) ABSTRACT

The invention relates to an apparatus for determining and/or monitoring the process-variable fill-level of a fill substance in a container. The apparatus of the invention is to satisfy high demands with respect to chemical resistance and/or cleanability, while permitting individual parts to be replaced. In accordance with the invention, a housing part (2) is provided, which is securable on the container. Furthermore, a conductive element (3) is provided, which, when mounted, extends into the container, and which is coupled with the housing part (2) by means of a disengageable connection (4). The disengageable connection (4) is located in the interior of the housing part (2).

9 Claims, 1 Drawing Sheet

DEVICE FOR DETERMINING AND/OR MONITORING THE FILL-LEVEL PROCESS VARIABLE OF A SUBSTANCE IN A CONTAINER

TECHNICAL FIELD

The invention relates to an apparatus for determining and/or monitoring the process-variable fill-level of a fill substance in a container.

BACKGROUND DISCUSSION

TDR (Time-Domain-Reflectometry) measuring devices are used increasingly for detecting fill level of liquids or bulk goods in containers. In the TDR measurement method, electromagnetic, high-frequency pulses or continuous microwaves are guided into, respectively out of, the container along a conductive element. The conductive element is e.g. a rod- or cable-probe.

In physical terms, the TDR measurement method exploits the effect that, at the interface between which two different media meet, e.g. air and oil, or air and water, due to the abrupt change (discontinuity) of the dielectric constants of the two media, a portion of the guided electromagnetic, high-frequency pulses, or microwaves, is reflected, and guided via the conductive element back into a receiving apparatus. The greater the difference between the dielectric constants of the two media, the greater is the portion of the high-frequency pulses, or microwaves, reflected. Based on the travel time of the pulses or waves, the distance to the interface can be determined. If the empty distance of the container is known, the fill level of the fill substance can then be calculated.

TDR measuring devices with guided high-frequency measuring signals (pulses or waves) are distinguished by low signal damping, as compared with measuring devices, in which measuring signals are radiated freely. The reason for this is that the power flow occurs along the rod- or cable-probe, i.e. along a conductive element. Furthermore, TDR measuring devices have, even in the case of small measured distances, a high level of precision, because, when compared to measuring devices which freely radiate microwaves, they have a larger signal bandwidth, and therefore achieve better definition between useful, i.e. wanted, signals, and disturbance signals. A further advantage of TDR measuring devices lies in their high level of certainty and reliability of fill level measurement. This is because a measurement taken with guided measuring signals is relatively independent of the properties of the fill substance, the construction of the container (e.g. material, geometry), or other operating conditions (e.g. dust, accretion).

In addition, it has become known to determine the fill level of a fill substance in a container by means of a capacitive fill-level measuring device. Here also, a conductive element extends into the container. An alternating voltage signal from a signal source is applied to the conductive element. Via a measuring/evaluating circuit, the instantaneous, measured capacitance is established, and compared with a predetermined reference value for capacitance. On the basis of this data, the fill level of the fill substance is determined.

In capacitive methods for determining the fill level of a fill substance in a container, the capacitive probe and the container wall form the electrodes of a capacitor. In the case that the container wall is not conductive, a separate, second electrode must be provided inside or outside of the container. Depending on the fill level of the medium in the container, either the gaseous atmosphere of the container, or the fill substance, is located between the two electrodes. This is reflected in a change of the measured capacitance, based on the different dielectric constants of the two substances. Thus the measured capacitance shows a dependence on the particular fill level of the fill substance in the container. Capacitive probes can be used for detecting limit levels, as well as for continuously determining fill level. Additionally, conductive fill-level measuring devices also belong to the state of the art.

Devices of the type previously mentioned are used in a variety of ways in the pharmaceutical and foods industries, in the chemical industry, in electroplating and similar industries, and must fulfill a wide range of requirements in such applications.

The parts of these devices which touch the product are normally subject to considerable wear, for example through corrosion, abrasion, embrittlement, increase in hardness, surface cracking, or other deterioration. It is thus a great advantage, if the individual, wearing parts can be changed without needing to replace the entire measuring probe.

If these devices come into contact with food- or pharmaceutical products, then they must, for understandable reasons, meet the highest requirements for hygiene. The hygiene requirements for metrological devices are formulated by standards boards. In this connection, for example, there is the European standard EN 1672-2:1997, which has the status of a national German standard. This standard supplements the generally applicable, essential safety and health requirements of the EC Machine Directive 89/392/EEC of the Council of the European Communities by providing detailed requirements for machines used in the foods industry. On the same level with these standards is the state of the art, as published in the form of guidelines by groups of experts, such as the "EHEDG Guidelines" of the "European Hygienic Equipment Design Group", or the "ASME-BPE" of the "American Society of Mechanical Engineers". In these standards and guidelines, cleanability plays a central role, because such is essential for preventing health-endangering germs.

Potential collecting recesses for health-endangering germs tend to be found in areas in which two disengageable parts of a measuring apparatus are connected to each other. Especially critical are relatively narrow and tightly-dimensioned, interstitial spaces. A critical contact region, for example, is where the conductive element is attached on the measuring device. If there is a gap in the contact region between the conductive element and the measuring device, then the fill substance contained by the container can penetrate into the gap and deposit there. It is known that narrow gaps cannot be thoroughly cleaned, or can be only inadequately cleaned. A further problem with gaps is their tendency to corrode, so that, independenty of the hygienic requirements, gaps which come into contact with the fill substance must be prevented as much as possible.

In order to prevent this problem, it has become common to manufacture probes that are fully insulated with plastic (e.g. PFTE). These fully-insulated probes are very well-suited for hygienic applications, since, in this case, gaps which may come into contact with the fill substance are completely eliminated. However, these fully-insulated probes are expensive and susceptible to mechanical damage.

Furthermore, conical seals are also common, in which an insulating material is arranged in a bushing between the conductive element and housing. However, such conical seals are not permanently tight and free of gaps. The same is true for conical seals between the insulator and metallic adapter serving as the process connection. In addition, when replacing individual parts, such constructions can be disassembled only with great complexity since complicated spring mechanisms must be used to re-tighten the cones.

SUMMARY OF THE INVENTION

Therefore, an object of the invention is to provide a measuring device which, on the one hand, has no gaps, thereby fulfilling high hygienic requirements and being little susceptible to gap corrosion, and which, on the other hand, can be disassembled for replacing individual parts.

This object is achieved by: Providing a housing part which can be secured on a container; providing a conductive element which, in the mounted state, extends into the container and is coupled with the housing part via a disengageable connection; and by locating the disengageable connection in the interior of the housing part. The disengageable connection is preferably a threaded connection or a plug connection. Since the connection between the conductive element and the housing part is located in the interior of the housing part, the connection area, which is especially susceptible to corrosion, is no longer in direct contact with the fill substance, thus greatly limiting susceptibility to corrosion.

In accordance with an advantageous embodiment of the apparatus of the invention, at least one process seal is provided, which is formed and arranged such that it seals the interior of the housing part from the process.

In connection with the apparatus of the invention, it is also especially favorable when an insulating element is arranged in a defined region between the conductive element and the housing part. The insulating element is composed of an insulating plastic material (e.g. PEEK, which is distinguished by high mechanical and chemical stability), or of ceramic. In this connection, it should be noted that, due to its high dielectric constant, ceramic can be used only conditionally in TDR measuring devices.

In accordance with a preferred embodiment of the apparatus of the invention, a first process seal and a second process seal are provided, with the first process seal being formed and arranged such that it seals the housing part essentially flushly and gap-free against the insulating element, and with the second process seal being formed and arranged such that it seals the insulating element essentially flushly and gap-free against the conductive element. Optionally, the dielectric insulation element can have an outer sealing contour, with which the insulation element can be sealingly secured to an opposing piece connected with the container. As an example of this, compare the process assemblies sold by the present assignee and meeting ISO 2852 or DIN 11864-1. If such an embodiment of the process connection is used, then the outer process seal can be reduced or omitted. However, the disadvantage of using a specialized process connection designed for specific sealing contours is that not every process connection can be subsequently adapted to the housing part. Thus, with such a specialized solution, the advantages of the modular construction of the measuring device, whereby the measuring device can be mounted on the container using a variety of process connections, are lost.

Preferably, the at least one process seal, or the first process seal and the second process seal, are, in each case, an O-ring or a molded seal. In this case, it is considered especially favorable when the process seals can be replaced by disengaging the conductive element or the process connection. In order to achieve a permanently gap-free and sealed connection between the individual parts, the individual parts are connected with one another such that the process seals are compressed under a defined prestress. For this purpose, mechanical stops, which limit the prestress on the seals, are provided on the parts to be connected.

As already mentioned above, the apparatus of the invention is a fill-level measuring device, which determines the fill level of a fill substance in a container via the travel time of high frequency measuring signals guided along a conductive element, or the apparatus is a fill-level measuring device which determines the fill level of the substance via a capacitive measuring method or a conductive measuring method.

In accordance with an advantageous further development of the apparatus of the invention, a disengageable securement part for securing the fill-level measuring device on the container is provided on the housing part. The mounting part can be any process connection.

In a preferred embodiment of the apparatus of the invention, a disengageable plug- and/or threaded connection is provided, by which an electronics part is coupled with the fill-level measuring device. In the detached condition, the plug- or threaded connection can preferably be sealed so that it is water-tight, e.g. via a screw cap sealed with an O-ring. In this way, it is possible to decouple the electronics component from the fill-level measuring device via the plug- or threaded connection, and to cleanse the fill-level measuring device in an autoclave if needed.

BRIEF DESCRIPTION OF THE DRAWINGS

The invention will now be described in greater detail on the basis of the drawings, the figures of which show as follows.

DETAILED DISCUSSION

Figure 1:
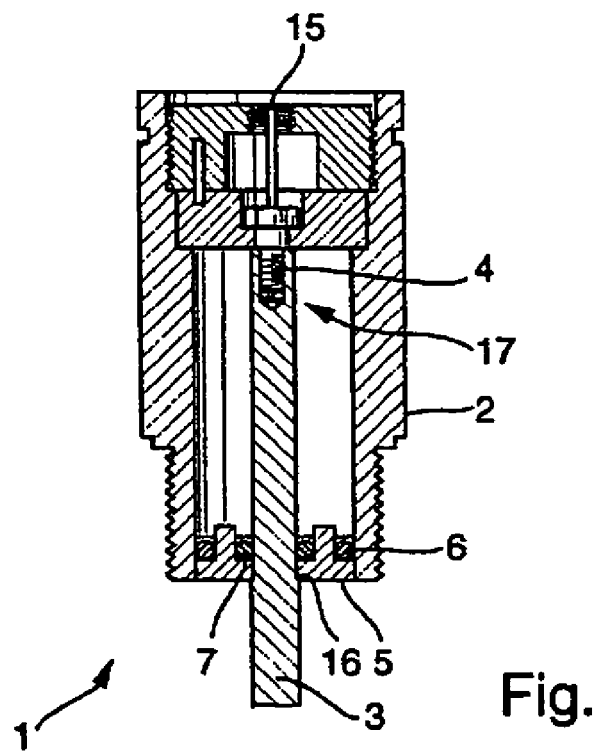
FIG. 1 a cross section through a first form of embodiment of the apparatus of the invention, and FIG. 2 a cross section through a second form of embodiment of the apparatus of the invention.

FIG. 1 shows a cross section through a first form of embodiment of the apparatus of the invention. The apparatus of the invention is a fill-level measuring device 1, which determines fill level of a fill substance in a container via a TDR-measuring method, or via a capacitive or conductive measuring method.

In mechanical terms, the fill-level measuring device 1 is composed of a housing part 2 and a conductive element 3. The conductive element 3 is connected with the housing part 2 via a disengageable connection 4, which is located in the interior 17 of the housing part 2. The interior 17 of the housing part 2 is sealed from the process by means of an insulating washer 5. The insulating washer 5 is secured toward the process by means of a stop 16 provided on the conductive element 3. The insulating washer 5 is sealed against the conductive element 3 via the O-ring 7; by means of the O-ring 6, the insulating washer 5 is sealed against the housing part 2.

An electric connection 15 for an electric plug (not separately shown in FIG. 1) is located in the housing part 2 facing away from the process.

By means of the disengageable connection 4, the conductive element 3 can be removed, and, in this way, if needed, the individual parts of the fill-level measuring device can be replaced. At the same time, the disengageable connection 4 is protected against corrosion by being located in the interior 17 of the housing part 2. Any methods for securing the disengageable connection 4 against unintended loosening can be used, especially those which would not be acceptable in the case of direct contact of the disengageable connection with the fill substance due to insufficient chemical resistance, such as binding coatings on the threads, or lock-washers.

This first form of embodiment of the apparatus of the invention is especially suited for applications in the chemicals industry.

Figure 2:
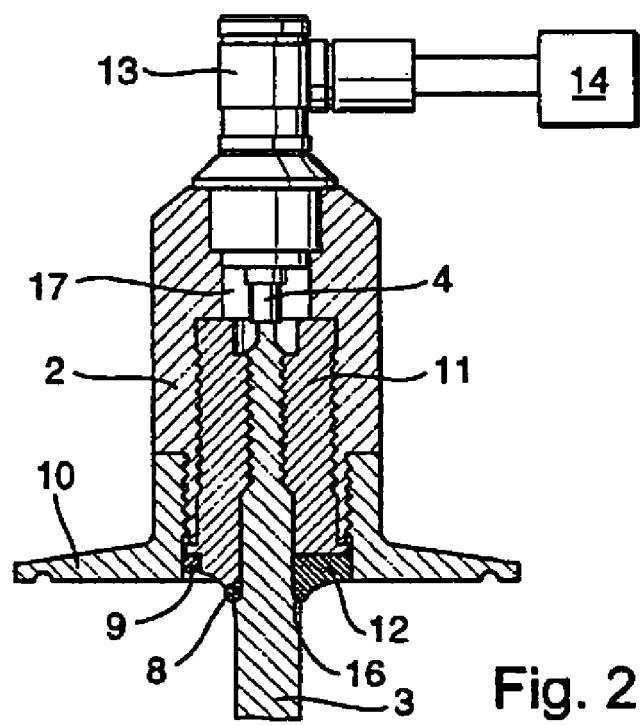

In FIG. 2, a cross section through a second form of embodiment of the apparatus 1 of the invention is shown. In this embodiment, an insulating element 11 is arranged in the interior 17 between the conductive element 3 and the housing part 2. The interior 17 is sealed gap-free against the process via the process seals 8, 9; 12. For this, a first process seal 9 is provided flushly between the housing part 2 and the insulating element 11, and a second process seal 8 is provided flushly between the insulating element 11 and the conductive element 3 (see FIG. 2 on the left side). Alternatively, a flush, molded seal 12 can be provided between the conductive element 3 and the housing part 2, as is shown on the right side of FIG. 2. In order to achieve a permanent, gap-free sealing of the interior 17 of the fill-level measuring device 1 against the process, the process seals 8, 9, or the process seal 12 are held in compression with a defined prestress, which is achieved through a mechanical abutment on the disengageable connection 4.

Especially advantageous in the form of embodiment of the apparatus of the invention shown in FIG. 2 is the disengageable securement part, e.g. the disengageable flange 10, which permits a modular adaptation of the fill level device to different process connections. In the example shown, it is a clamp connection according to ISO 2852; of course, process connections according to other industry standards are also possible here. In contrast to process connections clad with PFTE or similar soft materials according to the state of the art in application of fully-insulated measuring probes or measuring probes with conical seals, the disengageable securement part, respectively the disengageable flange 10, can be made of metal, and is thus clearly more durable and also remains sealed in the case of changing temperatures.

The invention claimed is:

1. An apparatus for determining and/or monitoring, as a process-variable, the fill level of a fill substance in a container, comprising:
   a housing part, which is securable on the container;
   a conductive element, which extends into the container in a mounted state and which is coupled with an electric connection for an electric plug located in said housing part by means of a disengageable connection; and
   at least one process seal which is formed and arranged flushly such that it seals the interior of said housing part and said disengageable connection gap-free against the process, wherein:
   said disengageable connection is arranged in an interior of said housing part.

2. The apparatus as claimed in claim 1, further comprising:
   an insulating element arranged in a defined area between said conductive element and said housing part.

3. The apparatus as claimed in claim 2, further comprising:
   a first process seal, which is formed and arranged such that it seals said housing part gap-free, essentially flushly against said insulating element; and
   a second process seal, which is formed and arranged such that it seals said insulating element gap-free, essentially flushly against said conductive element.

4. The apparatus as claimed in claim 1, wherein:
   said at least one process seal is an O-ring or a molded seal.

5. The apparatus as claimed in claim 1, wherein:
   said disengageable connection is a threaded connection or a plug connection.

6. The apparatus as claimed in claim 1, wherein:
   the apparatus is a fill-level measuring device, which determines fill level of fill substance in the container via travel time of high frequency measuring signals guided along said conductive element.

7. The apparatus as claimed in claim 1, wherein:
   the apparatus is a fill-level measuring device, which determines fill level of a fill substance via a capacitive measuring method or via a conductive measuring method.

8. The apparatus as claimed in claim 6, further comprising:
   a disengageable securement part for securing the fill-level measuring device on the container.

9. The apparatus as claimed in claim 6, further comprising:
   an electronics component; and
   a disengageable plug- and/or threaded-connection, by means of which said electronics component is coupled to the fill-level measuring device.

* * * * *